US009058742B2

(12) United States Patent
Conrardy et al.

(10) Patent No.: US 9,058,742 B2
(45) Date of Patent: Jun. 16, 2015

(54) METHODS FOR ILLUSTRATING AIRCRAFT SITUATIONAL INFORMATION

(71) Applicant: GE Aviation Systems LLC, Grand Rapids, MI (US)

(72) Inventors: Peter Jacob Conrardy, Tampa, FL (US); Christian Drake Meigs, Tampa, FL (US)

(73) Assignee: GE Aviation Systems, LLC, Grand Rapids, MI (US)

( * ) Notice: Subject to any disclaimer, the term of this patent is extended or adjusted under 35 U.S.C. 154(b) by 82 days.

(21) Appl. No.: 13/764,927

(22) Filed: Feb. 12, 2013

(65) Prior Publication Data

US 2014/0225753 A1 Aug. 14, 2014

(51) Int. Cl.
*G01C 21/00* (2006.01)
*G08G 5/00* (2006.01)
*G08G 5/02* (2006.01)

(52) U.S. Cl.
CPC ............ *G08G 5/0047* (2013.01); *G08G 5/0021* (2013.01); *G08G 5/0065* (2013.01); *G08G 5/025* (2013.01)

(58) Field of Classification Search
CPC ........................................................ B64D 45/04
USPC .......................................... 340/972, 947, 951
See application file for complete search history.

(56) References Cited

U.S. PATENT DOCUMENTS 5,047,942 A 9/1991 Middleton
5,499,025 A * 3/1996 Middleton et al. ............ 340/959
6,018,698 A 1/2000 Nicosia et al.
6,477,449 B1 11/2002 Conner et al.
7,014,146 B2 * 3/2006 Villaume et al. .............. 244/111
7,868,785 B1 1/2011 Wang
8,193,948 B1 6/2012 Shapiro et al.
8,589,071 B2 * 11/2013 Feyereisen et al. ........... 701/457
8,630,752 B2 * 1/2014 Gurusamy et al. ................ 701/7
2004/0046712 A1 3/2004 Naimer et al.
2007/0088491 A1 4/2007 He
2008/0215198 A1 9/2008 Richards
2009/0125168 A1 5/2009 Voisin
2010/0036550 A1 * 2/2010 Conner et al. .................... 701/9

FOREIGN PATENT DOCUMENTS

EP 2560152 A1 2/2013

OTHER PUBLICATIONS

Runway Awareness and Advisory System(RAAS), retrieved from "http://www.skybrary.aero/index.php/Runway_Awareness_and_Advisory_System_(RAAS)", Nov. 28, 2012, 3 pages.
A GB Combined Search and Opinion issued in connection with corresponding Application No. GB1402230.5 on Jun. 25, 2014.

* cited by examiner

*Primary Examiner* — Toan N Pham
(74) *Attorney, Agent, or Firm* — General Electric Company; William S. Munnerlyn

(57) ABSTRACT

Methods of illustrating aircraft situational information on a flight display in a cockpit of an aircraft, include determining a location of the aircraft, displaying on the flight display a forward looking graphical representation of the runway from the determined location of the aircraft, displaying situational awareness information on the graphical representation, and updating the location determination, graphical representation and the situational awareness information as the aircraft moves.

10 Claims, 5 Drawing Sheets

METHODS FOR ILLUSTRATING AIRCRAFT SITUATIONAL INFORMATION

BACKGROUND OF THE INVENTION

In contemporary aircraft, pilots determine risk assessments during takeoff and landing based on upon the knowledge and experience of the pilot, the type of aircraft, the weather conditions, etc. If the pilot has a gut feeling that the takeoff or landing will not be successful, then the pilot may attempt to abort such operations. Pilots develop a personal sense of the conditions under which a landing or a takeoff should be aborted. Such gut instincts are not always accurate; for example, thrust may be advanced too slowly and the aircraft will have already traveled down a portion of the runway beyond a point to safely abort the takeoff.

BRIEF DESCRIPTION OF THE INVENTION

In one embodiment, the invention relates to a method of illustrating aircraft situational information on a flight display in a cockpit of an aircraft, the method includes determining a location of the aircraft with respect to a runway, displaying on the flight display a forward looking graphical representation of the runway from the determined location of the aircraft, displaying situational awareness information on the graphical representation, and updating the location determination, graphical representation and the situational awareness information as the aircraft moves.

DESCRIPTION OF EMBODIMENTS OF THE INVENTION

Figure 1:
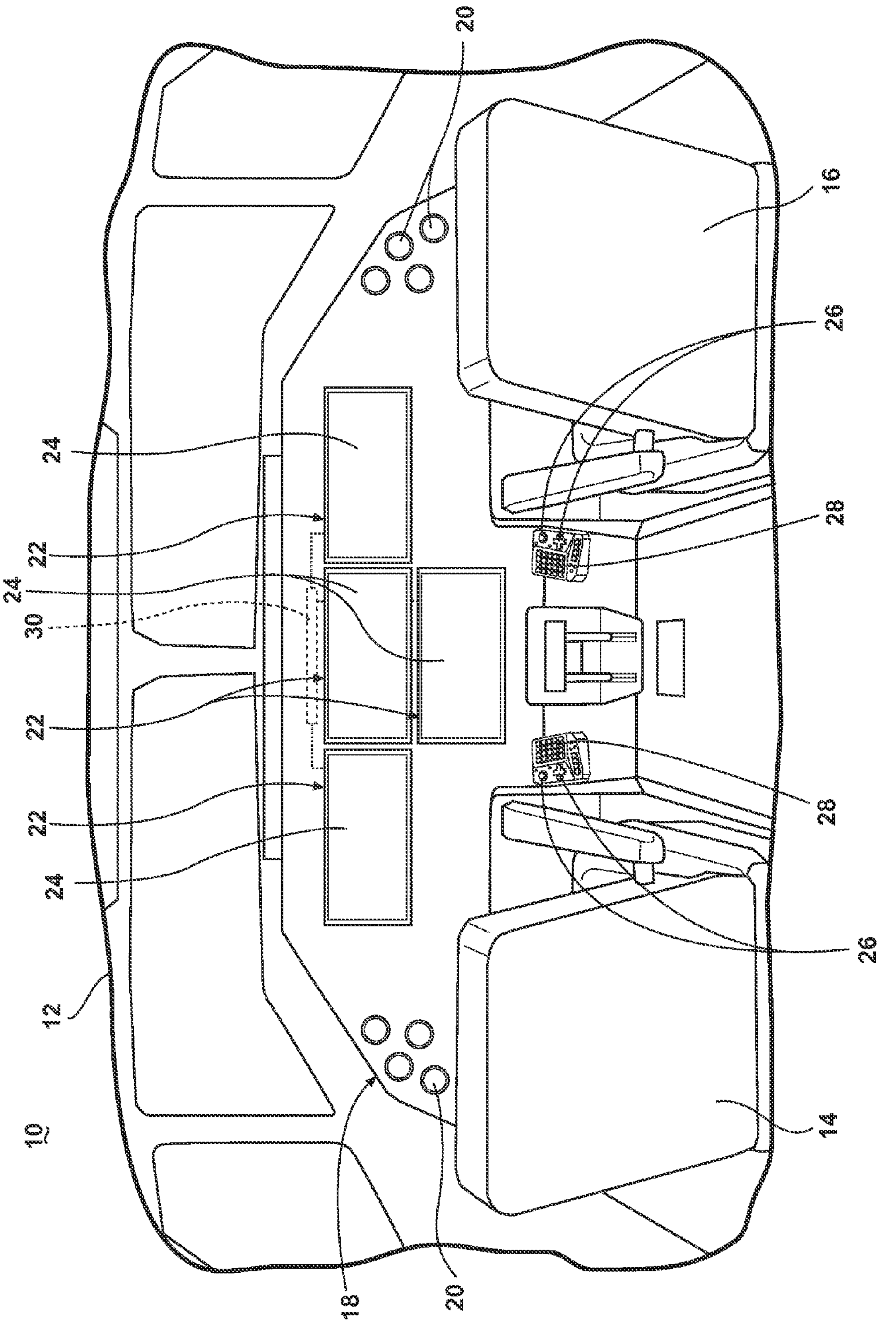
FIG. 1 is a perspective view of a portion of an aircraft cockpit with a flight display on which graphical representations and situational awareness information may be illustrated according to embodiments of the invention.

FIG. 1 illustrates a portion of an aircraft 10 having a cockpit 12. While a commercial aircraft has been illustrated, it is contemplated that embodiments of the invention may be used in any type of aircraft. A first user (e.g., a pilot) may be present in a seat 14 at the left side of the cockpit 12 and another user (e.g., a co-pilot) may be present at the right side of the cockpit 12 in a seat 16. A cockpit instrument panel 18 having various instruments 20 and multiple multifunction flight displays 22 may be located in front of the pilot and co-pilot and may provide the flight crew with information to aid in flying the aircraft 10.

The flight displays 22 may include either primary flight displays or multi-function displays and may display a wide range of aircraft, flight, navigation, and other information used in the operation and control of the aircraft 10. The flight displays 22 may be capable of displaying color graphics and text to a user. The flight displays 22 may be laid out in any manner including having fewer or more displays and need not be coplanar or the same size. A touch screen display or touch screen surface 24 may be included in the flight display 22 and may be used by one or more flight crew members, including the pilot and co-pilot, to interact with the systems of the aircraft 10. It is contemplated that one or more cursor control devices 26 and one or more multifunction keyboards 28 may be included in the cockpit 12 and may also be used by one or more flight crew members to interact with the systems of the aircraft 10.

A controller 30 may be operably coupled to components of the aircraft 10 including the flight displays 22, touch screen surface 24, cursor control devices 26, and keyboards 28. The controller 30 may also be connected with other controllers (not shown) of the aircraft 10. The controller 30 may include memory and processing units, which may be running any suitable programs to implement a graphical display or graphical user interface (GUI) and operating system.

The controller 30 may include a computer searchable database of information (not shown) or may be operably coupled to a database of information. For example, such a database may be stored on an alternative computer or controller. It will be understood that the database may be any suitable database, including a single database having multiple sets of data, multiple discrete databases linked together, or even a simple table of data.

It is contemplated that such a database may be located off the aircraft 10 at a location such as airline or flight operations department control (not shown) or another location and that the controller 30 may be operably coupled to a wireless network (not shown) over which the database information may be provided to the controller 30. This database may include pilot preferential data inputted via electronic means i.e. flash memory, internet, WiFi, LAN, SatComm or other electronic delivery means.

The database may include regulatory requirements e.g., FAA, airline company or aircraft operator, operations manual or specifications requirements and also pilot preferences, best practices and pilot optioned best practices for start-up, taxi, takeoff, departure procedures, climb, cruise, descent, arrival procedures, approach procedure selection, landing, reverse thrust usage, and taxi techniques. The database may also include runway data, navigational information, aircraft performance data, engine performance data, runway surface conditions, current outside weather conditions, etc.

Performance criteria for departure and for arrival may be derived by the controller 30 from the database dependent upon the airplane configuration: flaps, engine bleed air, missing or inoperative equipment, wheels, tires, brakes, reverse thrust, runway parameters and condition of the runway environment, weight, etc. Alternatively, such performance criteria may be uplinked by the Airline Operations Control (AOC) or manually figured by the crew and entered into the Flight Management System (FMS). Further, approach and landing field length requirements may be specified in the database and may define the minimum field length and minimum margins for performance.

Furthermore, the aircraft 10 may be equipped with various navigational tools including an inertial reference system (IRS) and/or global positioning system (GPS), which may also be operably coupled with the controller 30. The IRS may be an on-board system that senses the movement of the aircraft 10, and continuously calculates the aircraft's position, speed etc. The GPS may be installed on the aircraft 10 and gives position reports over a satellite and/or cellular network including a report of information such as speed, bearing and altitude.

During operation, the controller 30 may utilize inputs from the pilot, the database, and/or information from AOC or flight operations department to present a graphic representation and situational awareness information to the pilot or other users. From such information the pilot may make a more informed decision regarding takeoff or landing and aborting such maneuvers if necessary. A takeoff may be rejected for a variety of reasons, including engine failure, activation of the takeoff warning horn, direction from air traffic control, blown tires, system warnings, etc. A landing may be rejected for a variety of reasons including overshooting or undershooting the touchdown zone, the aircraft 10 is too fast, the aircraft 10 is not slowing down enough, etc.

Figure 2:
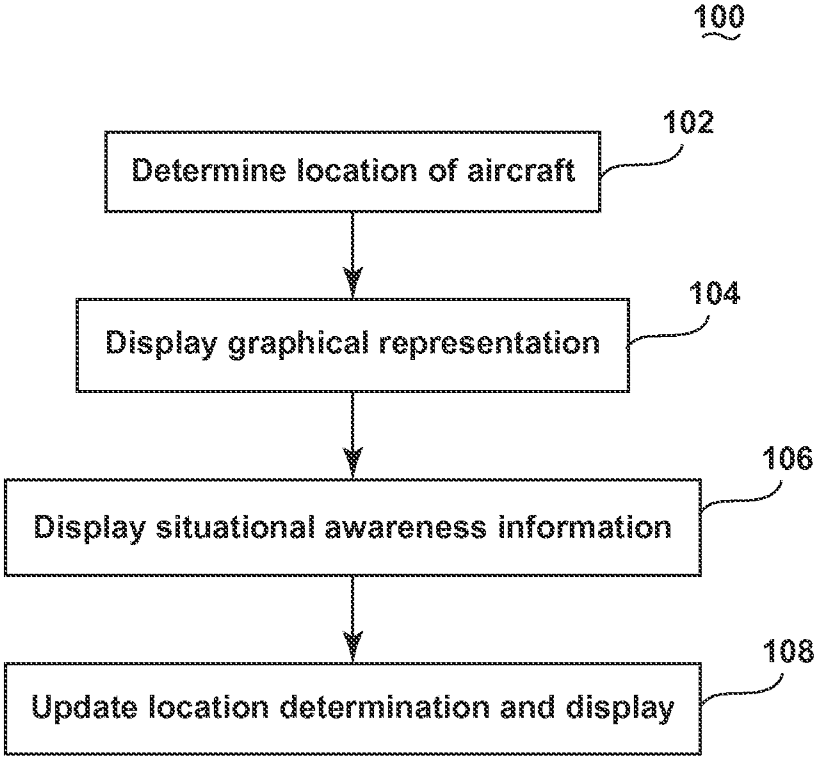
FIG. 2 is a flow chart showing a method of illustrating aircraft situational information according to an embodiment of the invention

In accordance with an embodiment of the invention, FIG. 2 illustrates a method 100, which may be used for illustrating aircraft situational information on a flight display 22 in the cockpit 12. The method 100 begins at 102 by determining a location of aircraft. During takeoff the determination may be with respect to the aircraft's location on the takeoff runway. During landing the determination may be with respect to the aircraft's location with respect to the landing runway. Regardless of whether the aircraft 10 is taking off or landing, determining the location of the aircraft 10 may include receiving runway data including data regarding a length of the runway and position of the runway. Determining the location of the aircraft 10 may include receiving coordinates from the GPS. Furthermore, a heading and/or position of the aircraft 10 may be determined. For example, the heading and position may be determined by receiving inputs from the IRS.

At 104 the controller 30 may display a forward looking graphical representation of the runway on the flight display 22. For example, the forward looking graphical representation may include a somewhat real-life representation that may be similar to a photograph or video taken from that geographical position on the runway. In this manner, it will be understood that the forward looking graphical representation of the runway may be based on the determined location of the aircraft relative to the runway. For example, displaying the graphical representation may include generating an image from at least one database stored on the aircraft 10 according to the determined location of the aircraft. If the heading and position of the aircraft have been determined, then the image may be generated taking into account this information as well. It will be understood that the graphical representation may be graphically illustrated in a variety of ways and that various aspects of the runway may be illustrated on the flight display 22 to better aid the pilot in making decisions with respect to takeoff and landing. For example, the graphical representation may be made 3D, may illustrate various characteristics of the runway including the centerline, slope, runway markings, etc.

The controller 30 may also display situational awareness information as indicated at 106. The situational awareness information may be displayed on the graphical representation. For example, velocity speeds may be displayed on the graphical representation to indicate where those velocity speeds should be achieved by the aircraft. The actual speeds represented by these velocity speed designations are true airspeeds specific to a particular model of aircraft, and are expressed in terms of the aircrafts indicated airspeed, so that pilots may use them directly, without having to apply correction factors. It is contemplated that these velocity speeds may be calculated by the aircraft or may be uploaded from AOC. The configuration of the aircraft 10 and operating conditions and settings may affect such speeds and may be taken into consideration when calculating the situational awareness information. It is contemplated that the situational awareness information may be predicted based on at least one of: aircraft performance, engine performance, runway data, runway surface conditions, inoperative equipment, required climb gradients, obstacles, and current outside weather conditions. Runway data may include information related to the structure of the runway including its shape, location, length, non-standard climb gradients, and slope. Such information may come from a runway database. Aircraft performance may include aerodynamics of the aircraft 10 and engine performance may include precision performance characteristics of the engines on the aircraft 10. Runway surface conditions may include information related to the type of material forming the runway, as well as weather the runway is currently slick or icy. Current outside weather conditions may include, among other things, air temperature, wind direction, and wind speed. In implementation, such factors may be converted to an algorithm to determine the situational awareness information. Such an algorithm may be converted to a computer program comprising a set of executable instructions, which may be executed by the controller 30 and may be used to display the situational awareness information on the graphical representation.

At 108, the location determination, graphical representation and the situational awareness information may be updated on the flight display 22 as the aircraft moves either along the runway or through the air. For example, the generated image and the situational awareness information displayed thereon may be updated based upon an updated location determination. Furthermore, if the heading and position of the aircraft 10 has been determined this may also be used to update the graphical representation and the situational awareness information. Furthermore, the situational awareness information may be updated with respect to any change in conditions or other factors that affect any of the situational awareness information determinations.

Figure 3:
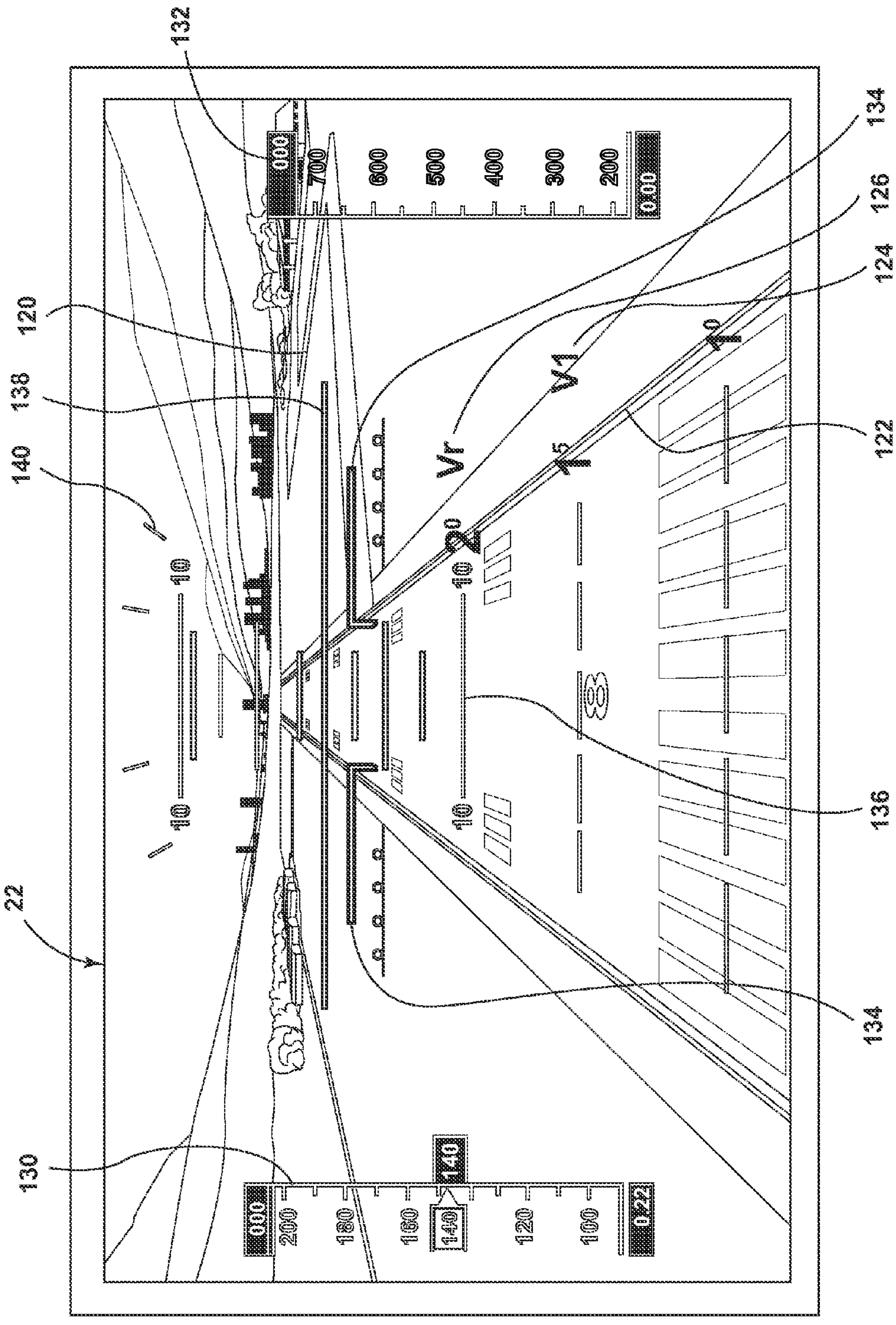
FIG. 3 is an exemplary view of an illustration of a graphical representation and situational awareness information displayed according to an embodiment of the invention.

Specific examples for takeoff and landing may prove useful. FIG. 3 illustrates a forward looking graphical representation 120 including a runway 122 that the aircraft 10 is about to takeoff on. During takeoff, critical elements of the takeoff roll of the aircraft 10 are the point at which thrust acceleration is achieved and the aircrafts position on the departure runway. Thrust acceleration is the point where the engine power is increased, with the advancement of the thrust levers, thrust becomes greater than drag and the airspeed increases. If thrust is advanced too slowly, the aircraft 10 will have traveled down a portion of the runway beyond a point to safely abort the takeoff below V1 without causing damage. Thus, the current aircraft position as it is traveling down the runway may be illustrated through the forward looking graphical representation 120 along with a variety of situational awareness information. The graphical representation may take any suitable form including that the forward looking graphical representation 120 may include a depiction of the runway 122 as it would appear with clear visibility.

In the illustrated example, the situational awareness information includes a V1 speed indicator at 124 and a Vr speed indicator at 126. The V1 speed indicator 124 and the Vr speed indicator 126 are shown on the screen, relative to the runway, at the location where the aircraft 10 needs to reach these speeds. The V1 speed indicator 124 indicates the last point where a stop can be initiated by the pilot, which may be referred to as the Go/No Go point. Typically engine failure below this speed should result in an aborted takeoff; above this speed the takeoff run should be continued. The Vr speed indicator 126 indicates the point where the speed of the aircraft 10 should be at a point where the nose wheel leaves the ground. This speed cannot be less than V1 or less than 1.05 times the minimum control speed in the air.

It is also contemplated that the situational information may include a V2 speed indicator. The V2 speed is the takeoff safety speed. At the takeoff safety speed, if the aircraft loses an engine, this is the speed at which the aircrafts maintain and climbs out to clear a thirty five foot obstacle.

The situational awareness information is displayed on the graphical representation so that the pilot may better associate the information with the movement of the aircraft 10. All of the situational information may be displayed on the graphical representation of the runway and with any airline or operations limits taken into account. For example, the situational awareness information may be displayed with respect to an appropriate 60% of the runway for departure, which is typically allowed for the aircraft to accelerate to V1 and leaves 40% of the runway to stop.

Further, information may also be included on the flight display 22 including that some of the additional information may be displayed on the graphical representation 120. For example, an air speed indicator 130 and an altitude indicator 132, which are all illustrated as scales, may be included. Conventional aircraft symbols 134, a ladder 136 that represents a pitch scale, an artificial horizon line 138, and a roll scale 140 may also be displayed.

Embodiments of the invention may also alert the pilot to at least one of a location of the aircraft on the runway and an unacceptable velocity speed of the aircraft. For example, the alert may indicate that the aircraft 10 is not in a safe position based on a thrust and aircraft speed of the aircraft 10. For example, a visual or aural alert in the cockpit 12 may alert the pilot if the aircraft is too far down the runway for a successful rejected takeoff maneuver. This may aid in preventing excessive aircraft damage.

Figure 4:
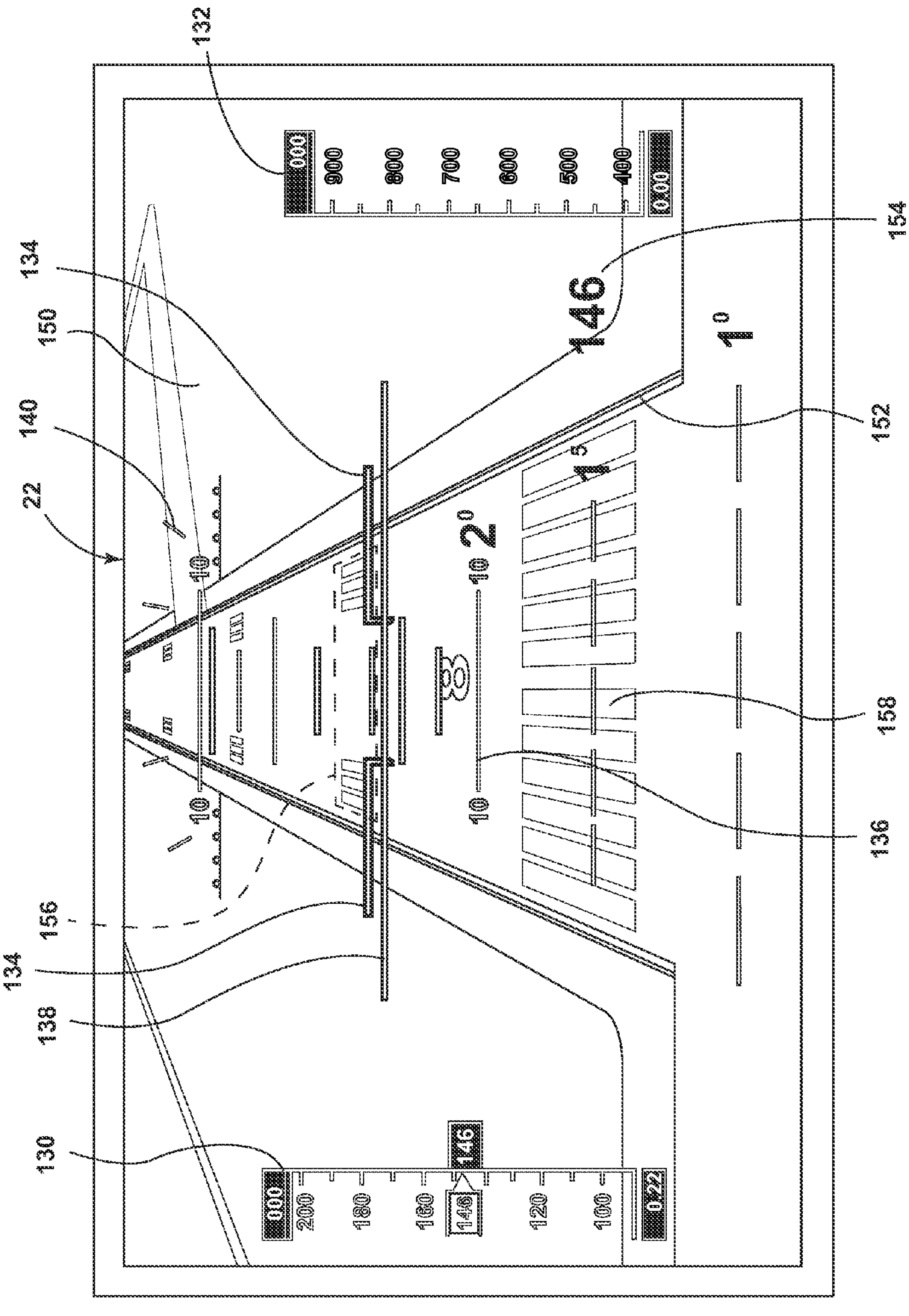
FIG. 4 is an exemplary view of an illustration of a graphical representation and situational awareness information according to another embodiment of the invention.

FIG. 4 illustrates another embodiment of an exemplary flight display 22 illustrating a forward looking graphical representation 150 including a runway 152 that the aircraft 10 is about to land on. The situational awareness information displayed includes a Vref speed indicator 154 and a touchdown zone indicator 156. The Vref speed indicator 154 illustrates the Vref speed or the speed the aircraft 10 should be decelerated to when it is crossing over the threshold 158. It may also be referred to as the landing reference speed or threshold crossing speed. For example, it may be 1.3 times the stall speed in landing configuration. The aircraft 10 should maintain this speed until it touches down in the touchdown zone 156. The touchdown zone indicator 156 may be any suitable indicator or indicia to alert the pilot to the touchdown zone, which is an area that should be utilized for touch down for a safe landing. If an aircraft is beyond the touchdown zone 156 then a missed approach maneuver should be initiated. As with the takeoff scenario, the location determination, graphical representation and the situational awareness information may be updated on the flight display as the aircraft moves.

Figure 5:
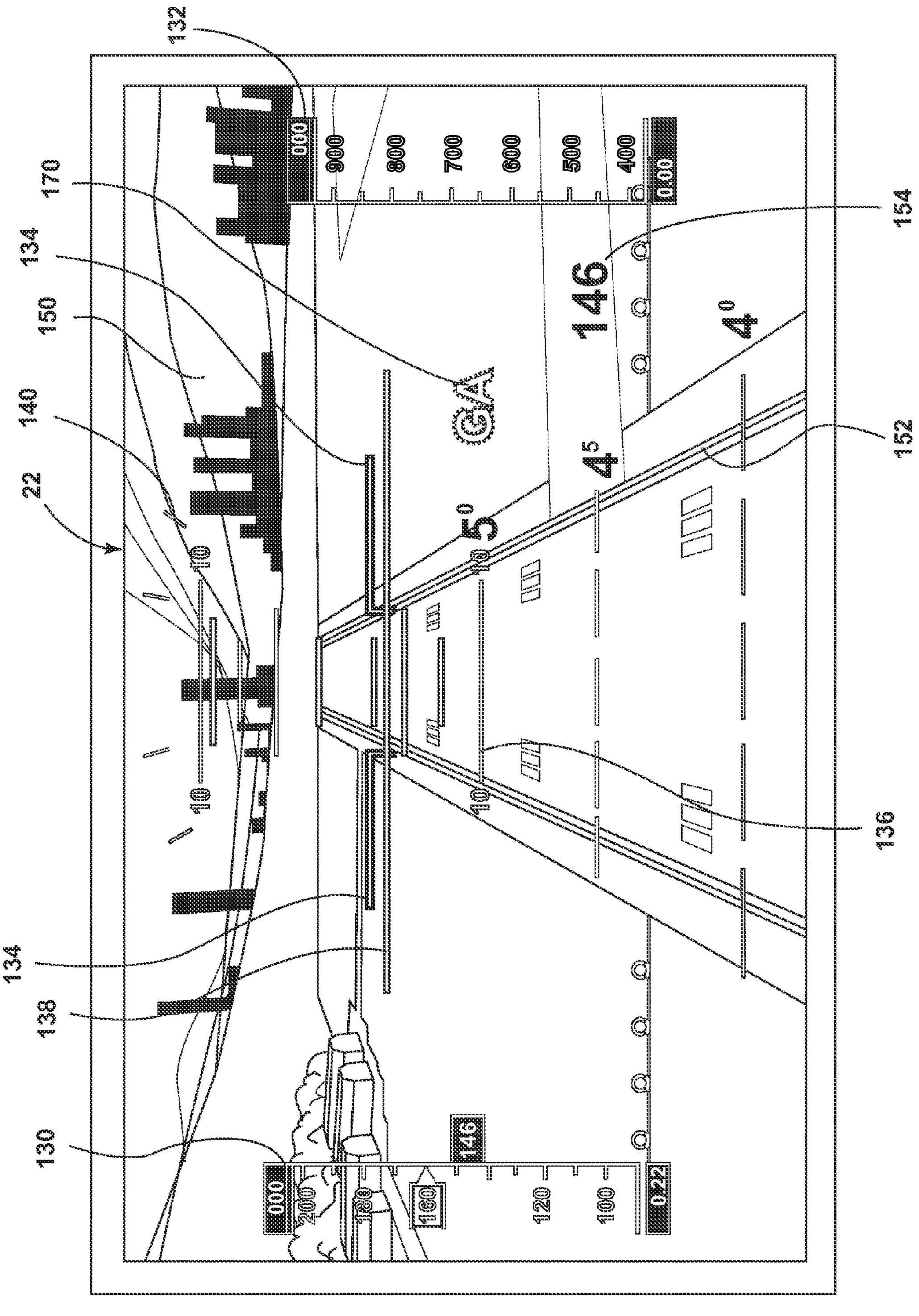
FIG. 5 is an exemplary view of an illustration of a graphical representation and situational awareness information according to yet another embodiment of the invention.

It is also contemplated that a user in the cockpit 12 may be alerted as to the location of the aircraft with respect to the runway on which it is to land. For example, the alert may indicate the aircraft should perform a go around procedure as indicated in FIG. 5 at 170. This may be determined by the controller 30 based on the Vref speed and the location of the aircraft. In the illustrated example, the aircraft 10 should go around because the speed of the aircraft is much greater than the Vref speed and the aircraft 10 is too far down the runway 152. Going around will allow the aircraft 10 to safely touchdown and decelerate prior to the end of the runway 152. Alternatively, an alert may be displayed that may indicate that the aircraft is traveling above the Vref speed. Further still, an alert may be displayed that indicates the aircraft 10 will undershoot the touchdown zone or that indicates that the aircraft 10 has traveled beyond the touchdown zone 156.

The above described embodiments provide a variety of benefits including that the pilot may make a more accurate assessment of the takeoff or landing situation. The technical effect of the embodiments of the invention being that the pilot is presented with a graphical representation of the runway on which it is to take off or land and situational awareness information is shown to allow pilots to more easily and immediately identify threats and mitigate these threats. This may subsequently result in a reduced number of rejected takeoff related accidents by improving the pilot's decision making through increased knowledge. Further, this may result in a reduced number of overrun incidents during the landing phase of flight.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of illustrating aircraft situational information on a flight display in a cockpit of an aircraft, the method comprising:

determining a location of the aircraft with respect to a runway on which it is to land;

displaying on the flight display a forward looking graphical representation of the runway from the determined location of the aircraft;

displaying situational awareness information on the graphical representation and where the situational awareness information comprises a Vref speed indicator, which indicates the speed the aircraft should be decelerated to when it is crossing over a predetermined threshold, and a touchdown zone indicator; and updating the location determination, graphical representation and the situational awareness information as the aircraft moves.

2. The method of claim 1 wherein the determining the location of the aircraft comprises receiving runway data including data regarding a length of the runway.

3. The method of claim 2 wherein the determining the location of the aircraft further comprises receiving coordinates from a Global Positioning System.

4. The method of claim 1, further comprising determining a heading and position of the aircraft and updating the location determination, graphical representation and the situational awareness information based on the determined heading and position.

5. The method of claim 1 wherein the situational awareness information is predicted based on at least one of: aircraft performance, engine performance, runway data, runway surface conditions, inoperative equipment, required climb gradients, obstacles, and current outside weather conditions.

6. The method of claim 1, further comprising alerting a user as to the location of the aircraft with respect to the runway.

7. The method of claim 6 wherein the alert indicates the aircraft should perform a go around procedure based on the Vref speed and the location of the aircraft.

8. The method of claim 6 wherein the alert indicates the aircraft will undershoot the touchdown zone.

9. The method of claim 6 wherein the alert indicates the aircraft has traveled beyond the touchdown zone.

10. The method of claim 6 wherein the alert indicates the aircraft is traveling above the Vref speed.

* * * * *